United States Patent [19]
Kim et al.

[11] Patent Number: 6,083,543
[45] Date of Patent: Jul. 4, 2000

[54] ELECTRICAL THERMOSTATIC PRESSURE COOKER AND COOKING CONTROL METHOD THEREOF

[75] Inventors: Jung Yeon Kim, Yangsan; Kyung Cheon Koh, Busan, both of Rep. of Korea

[73] Assignee: Sungkwang Electronic Co., Ltd., Rep. of Korea

[21] Appl. No.: 09/151,513

[22] Filed: Sep. 11, 1998

[30] Foreign Application Priority Data

Jul. 25, 1998 [JP] Japan ..................................... 98-30039

[51] Int. Cl.⁷ .............................. A23L 1/00; A47J 37/00
[52] U.S. Cl. .............................. 426/231; 99/330; 99/337; 99/403; 426/233; 426/523
[58] Field of Search ..................... 426/231, 233, 426/510, 523, 438; 99/330, 337, 403

[56] References Cited

U.S. PATENT DOCUMENTS

| | | | |
|---|---|---|---|
| 4,608,260 | 8/1986 | Andre | 426/233 |
| 5,039,535 | 8/1991 | Lang et al. | 426/233 |
| 5,706,717 | 1/1998 | Barner | 426/233 |

*Primary Examiner*—George C. Yeung
*Attorney, Agent, or Firm*—Ostrolenk, Faber, Gerb & Soffen, LLP

[57] ABSTRACT

An electrical thermostatic pressure cooker and cooking control method thereof is disclosed. The method includes the steps of determining whether a frying (includes roasting, browning and sauteing) cooking is set, setting a cooking time period when frying cooking is determined to have been set, continuing the heating operation for a predetermined time until the temperature in the cooker reaches a predetermined temperature (T4) after a start button is pressed, halting the heating operation and generating a buzzer sound when the temperature in the cooker has reached the predetermined temperature (T4), determining whether cooking is completed while controlling the heating operation so as to maintain a temperature range (T5–T6) when the cooking proceeds after the ingredient to be cooked is input, and completing the cooking operation after generating the buzzer sound when the cooking is completed such that T4>T6>T5. The cooker allows a user to set a random cooking period as well as enabling frying style cooking in addition to the conventional pressure-applied cooking.

10 Claims, 8 Drawing Sheets

ELECTRICAL THERMOSTATIC PRESSURE COOKER AND COOKING CONTROL METHOD THEREOF

BACKGROUND OF THE INVENTION

1. Field of the Invention

The present invention relates to an electrical cooker, and more particularly, to an improved electrical thermostatic pressure cooker and cooking control method thereof.

2. Description of the Background Art

Conventionally, an electrical thermostatic pressure cooker is provided such that power is applied to a solenoid valve when cooking is completed, thereby discharging steam within the cooker.

However, since the conventional pressure cooker is not provided with an alarm function so that a user can perceive the steam discharge thereby, if there occurs an abrupt steam exhaustion without the user's prior notice, the user may be subject to a variety of potential safety hazards resulting from physical exposure to the hot steam.

Although the conventional pressure cooker enables various types of cooking, its application is typically limited to Korean style cooking, such as rice cooking, and it has been difficult to further apply to Western style cooking such as frying, roasting, browning and sauteing.

SUMMARY OF THE INVENTION

The present invention is directed to overcoming the conventional disadvantages.

Accordingly, it is an object of the present invention to provide an electrical thermostatic pressure cooker and cooking control method thereof which provides improved convenience by allowing a user to randomly set the cooking period as well as enabling frying (hereinafter also includes roasting, browning and sauteing style cooking in addition to the conventional pressure-applied cooking.

It is another object of the present invention to provide an electrical thermostatic pressure cooker and cooking control method thereof which is able to notify the user of the start of a steam discharge a few minutes prior to the completion of pressure cooking and which virtually completes the steam discharge before cooking completion, thereby realizing an improved convenience in cooking and preventing an otherwise possible accident from occurring.

To achieve the above-described objects, there is provided an electrical thermostatic pressure cooker according to the present invention which includes a menu button for selecting frying cooking or pressure cooking, a time setting button for setting a time period of a predetermined cooking operation depending on the cooking, mode a display means for displaying the cooking mode and an expected cooking time period, an alarm means for alarming a cooking ingredient input time point and a cooking completion time point, a steam discharge valve for discharging the steam from the cooker, a compulsory button for forcibly discharging the steam when pressure cooking, and a control means for displaying a cooking mode selected from the menu button and the cooking time period selected using the time setting button and using a stored program for pressure cooking and frying cooking, controlling the alarm means to generate an alarm sound to notify a user of the cooking ingredient input when a predetermined temperature is reached in case of the frying cooking while executing a heating process, driving the steam discharge valve to automatically discharge the pressurized steam after a predetermined time point prior to completion of the cooking operation and to continuously discharge the pressurized steam when the steam discharge button is pressed when in the pressure cooking mode, and again controlling the alarm means to generate the alarm to notify the user that cooking operation has been completed at the completion time point.

Further, to achieve the above-described objects, according to the present invention, there is provided a cooking control method for an electrical thermostatic pressure cooker which controls the cooking steps depending on the type of cooking with the provision of a plurality of cooking menus. The present invention includes a first step for determining whether a pressure cooking mode is set, a second step for setting a cooking time period after setting the pressure cooking mode, a third step for proceeding to a heating process when a cooking start button is pressed after the cooking time period is set and for determining whether the present time is a completion time point of a cooking operation or whether a steam discharge button is pressed, a fourth step for displaying the recess time during a completion time point of the heating process while carrying out the recess process, and for determining the present time is a first predetermined time period prior to the completion of the recess process, a fifth step automatically discharging the pressurized steam when a predetermined time is reached prior to the completion of the recess process, a sixth step for carrying out a forcible discharge of the pressurized steam when the steam discharge button is pressed, and a seventh step for generating a buzzer sound when the cooking operation completion time is reached.

Also, to achieve the above-described objects, there is provided a cooking control method for an electrical thermostatic pressure cooker according to the present invention which includes a first step for determining whether a frying including roasting, browning and sauteing cooking operation is set, a second step for setting a cooking time period when the frying cooking operation is determined to be set a third step for performing a heating operation for a predetermined time until a temperature in the cooker has reached a first predetermined temperature (T4) after a when the start button is pressed, a fourth step for halting the heating operation and generating a buzzer sound when the temperature in the cooker has reached the first predetermined temperature (T4), a fifth step for determining whether the cooking is completed while controlling the heating operation so as to maintain a temperature range between a second predetermined temperature (T5) and a third predetermined temperature (T6) when cooking after the ingredients to be cooked have been placed in the cooker, and a sixth step for completing the cooking operation after generating the buzzer sound when the cooking operation is completed when T4>T6>T5.

The objects and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will better understood with reference to the accompanying drawings which are given only by way of illustration and thus are not limitative of the present invention, wherein.

DETAILED DESCRIPTION OF THE PREFERRED EMBODIMENTS

With reference to the accompanying drawings, the electrical thermostatic pressure cooker according to the present invention will now be described.

Figure 1:
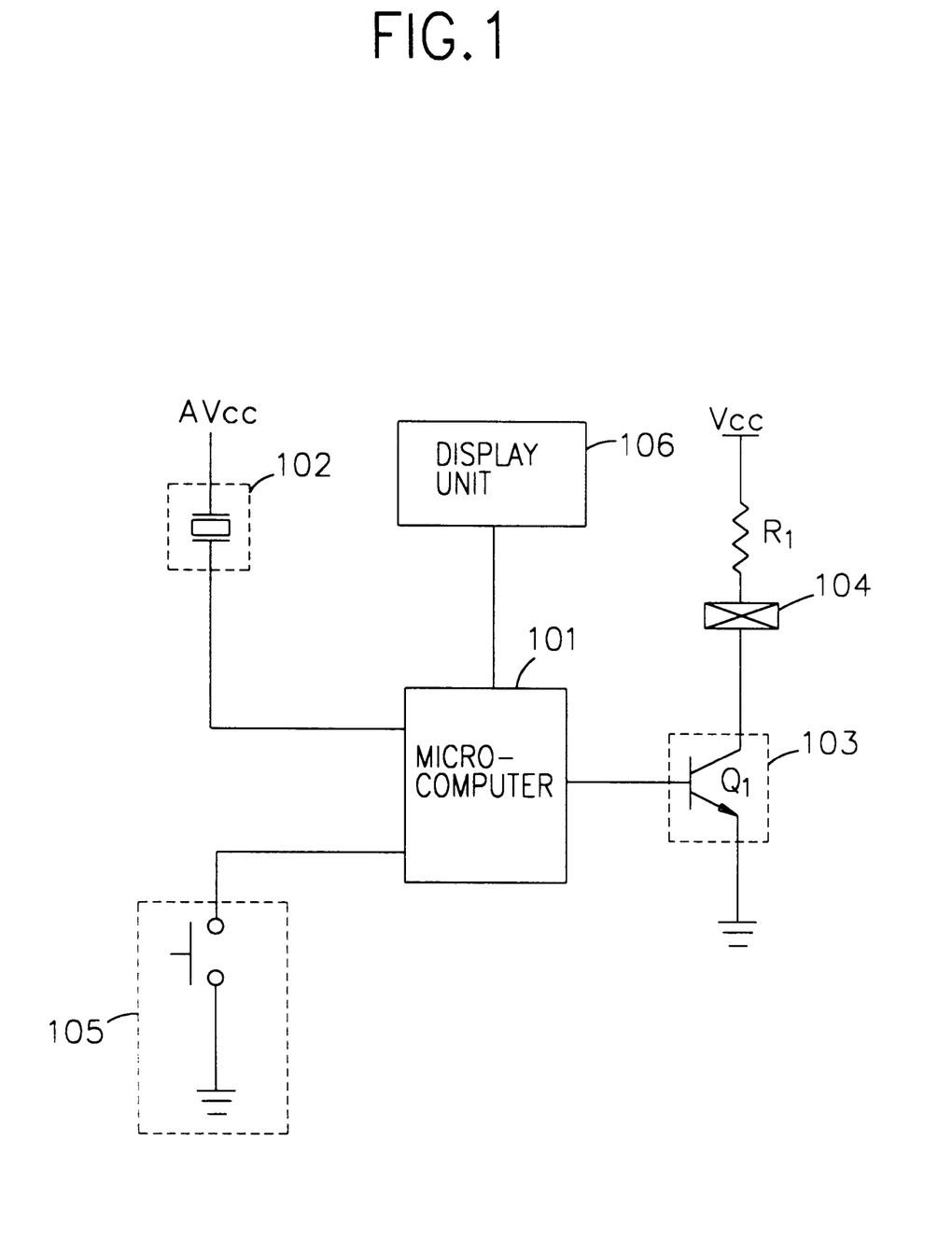
FIG. 1 is a block diagram illustrating an embodiment of an electrical thermostatic pressure cooker according to the present invention.

As shown in FIG. 1, the electrical thermostatic pressure cooker according to the present invention includes: a microcomputer 101 controlling the displaying of the cooking mode and cooking period selected at a key input unit 105 after controlling the displaying of an initial cooking menu on a display unit 106 and controlling the operation of the selected cooking mode when a start button is pressed at the key input unit 106; a buzzer 102 generating a sound in accordance with a buzzer driving signal; a valve driving unit 103 applying a power supply voltage Vcc to a steam discharge valve 104 in accordance with a valve driving signal for discharging pressurized steam from the cooker; the steam discharge valve 104; the key input unit 105 enabling a user to select a cooking mode, a cooking time period, a cooking start time, a set mode cancel, and a thermostat function; and the display unit 106 displaying the selected cooking mode, the cooking period and the like.

When the frying cooking mode is selected at the key input unit 105 and the start button is pressed, the microcomputer 101 outputs a buzzer driving signal to generate a buzzer sound and controls a heating element (not shown) to raise the cooking temperature to a predetermined temperature T4 in proportion to the time which has elapsed and proceeds with the cooking operation by heating the cooker to maintain a predetermined temperature range of T5–T6. That is, the buzzer driving signal is outputted to generate the buzzer sound when the cooking operation is completed.

Also, the microcomputer 101 controls the heating element (not shown) to proportionally heat the cooker to a predetermined temperature T1 when the pressure cooking mode is selected at the key input unit 105 and proceeds with the cooking operation while heating the cooker to maintain the predetermined temperature range of T5–T6, and controls the valve driving unit 103 for a few minutes before reaching a completion point of the recess process to allow the steam discharge valve 104 to be temporarily turned on and then keep it turned on thereafter or control the valve driving unit 103 when the steam discharge button 115 is pressed by the user to keep the steam discharge valve 104 turned on, for thereby carrying out a steam discharge operation of the cooker.

The valve driving unit 103 includes a bipolar transistor Q1 having its emitter grounded which is turned on so as to apply the power supply voltage Vcc to the steam discharge valve 104 when the valve driving signal outputted from the microcomputer 101 rises to a high level.

Reference numeral 'R1' denotes a resistance for limiting the supply current applied to the steam discharge valve 104.

Figure 2:
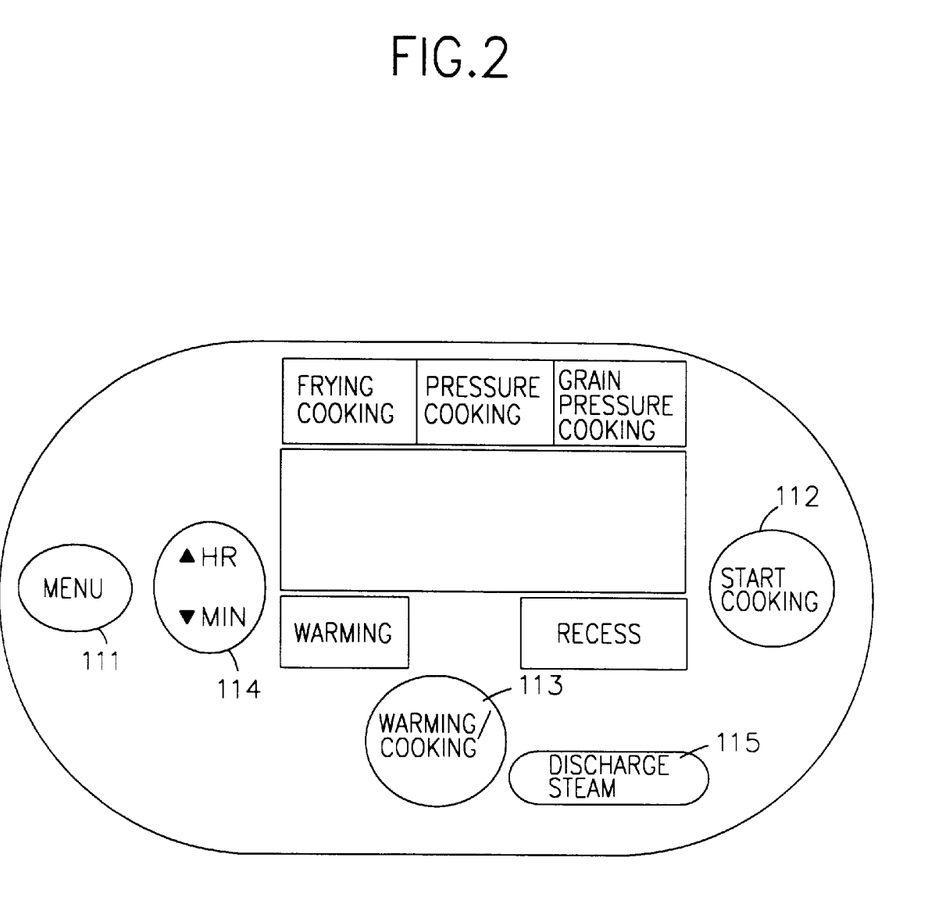
FIG. 2 is an exemplary view illustrating a control panel of the electrical thermostatic pressure cooker according to the present invention.

As shown in FIG. 2 illustrating a control panel, the key input unit 105 includes a menu button 111 for selecting a cooking menu, a start button 112 for starting the selected cooking operation, a cooking/warming button 113 for selecting cooking or warming, a time setting button 114 for setting a cooking period, and a steam discharge button 115 for manually discharging the pressurized steam from the cooker.

The operation and effects of the thusly constituted electrical thermostatic pressure cooker according to the preferred embodiments of the present invention will now be described.

Initially, the menu button 111 of the key input unit 105 is optionally pressed to select a general pressure cooking mode, a frying cooking mode or a grain pressure cooking mode.

Figure 4:
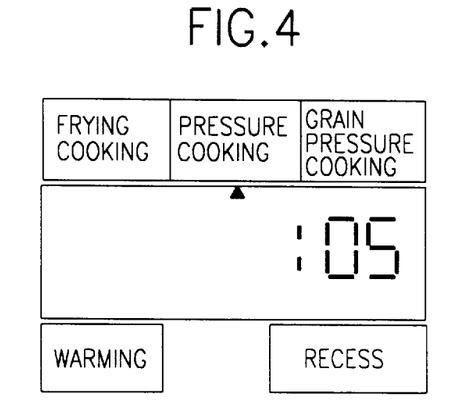
FIG. 4 is an exemplary view illustrating the display unit in FIG. 2 when set for pressure cooking.
Figure 9:
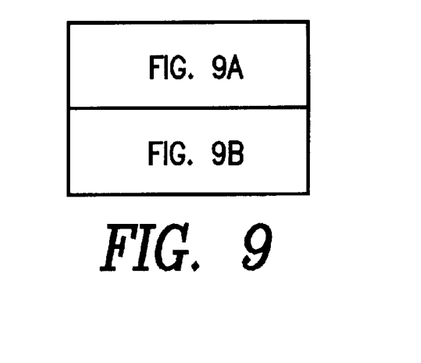
FIGS. 9A and 9B is a flow chart illustrating a pressure cooking process of the electrical thermostatic pressure cooker according to the present invention.
Figure 9A:
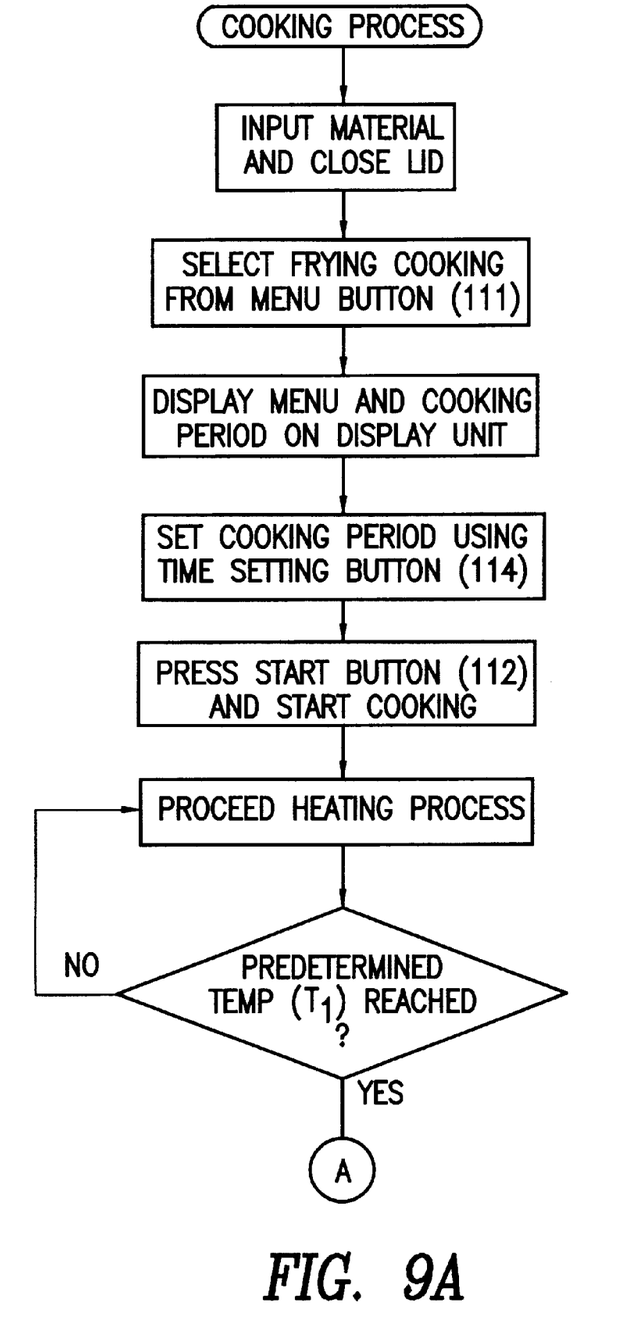
Figure 9B:
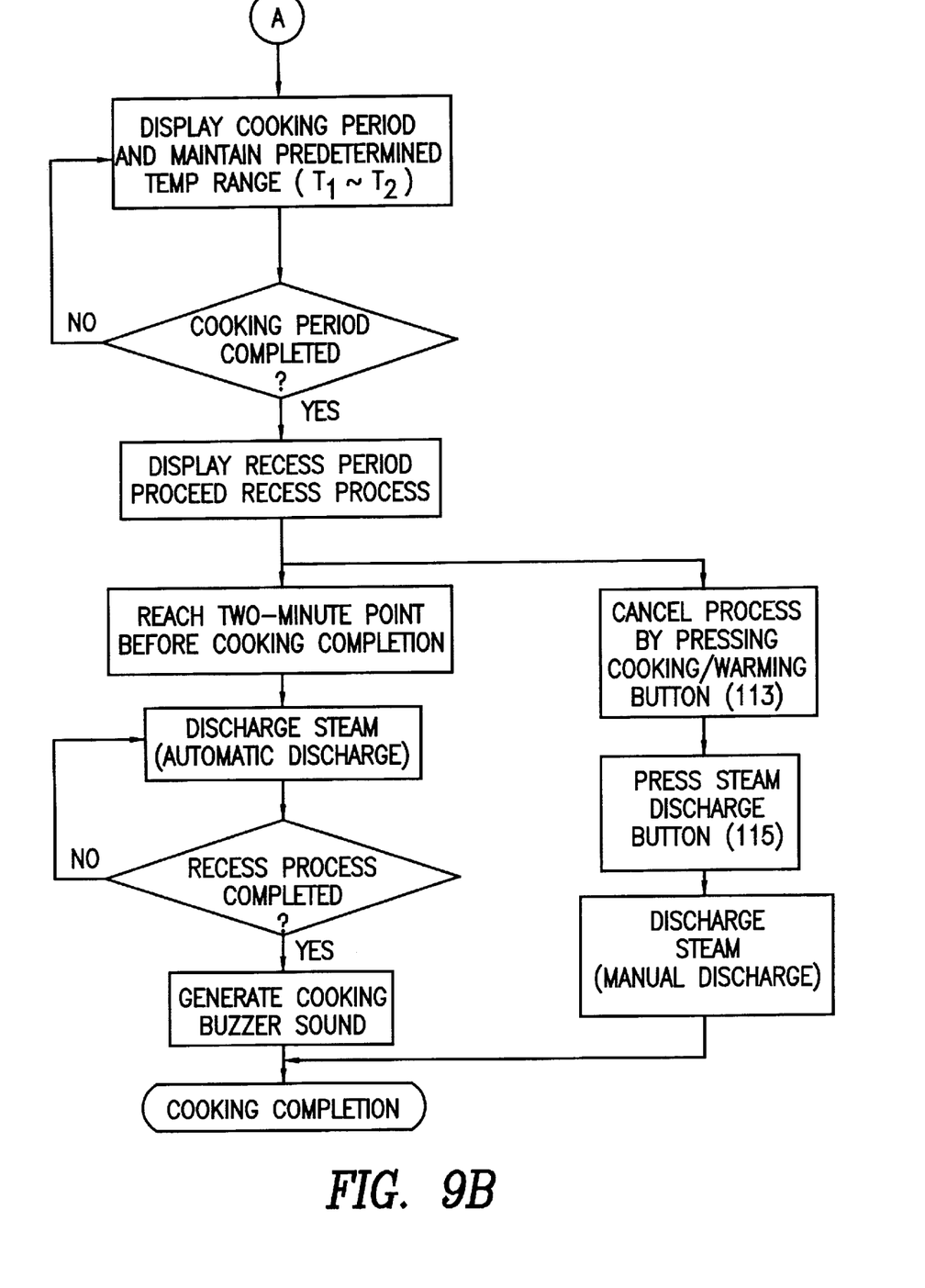

FIG. 9 is a flow chart illustrating the general pressure cooking process. As illustrated therein, when a user selects a general pressure cooking mode via the menu button 111 after appropriately filling the cooker with the desired cooking ingredients, the microcomputer 101 causes the display unit 106 to display the selected menu and a standard cooking period, as shown in FIG. 4. At this time, the user can reset or change the cooking time period using the time setting button 114.

When the cooking mode and the cooking period are desirably set, if the user presses the cooking start button 112, the microcomputer 101 starts the required cooking operation.

Figure 7:
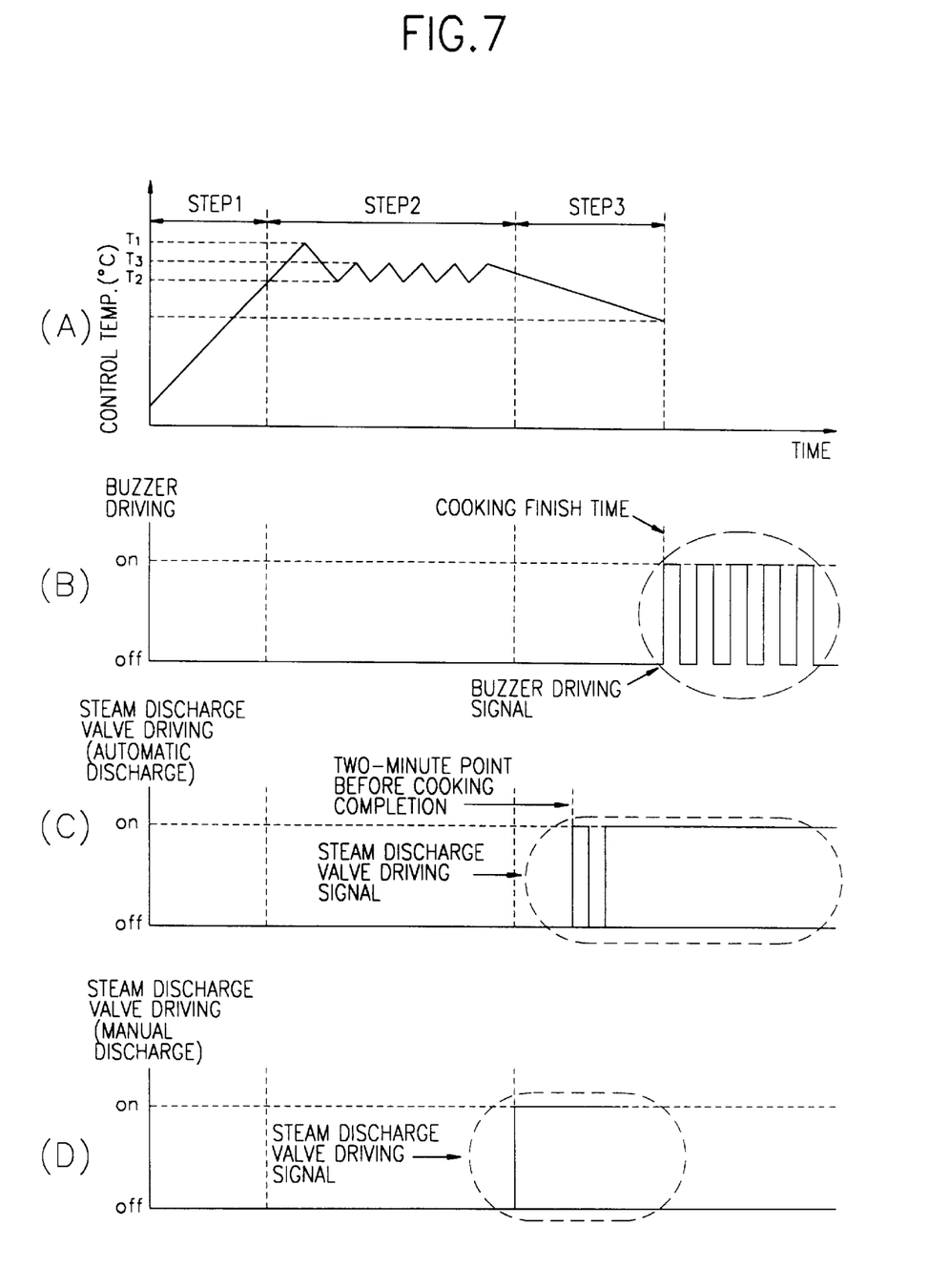
FIGS. 7A through 7D are waveform diagrams illustrating signals in the pressure cooking process of the electrical thermostatic pressure cooker according to the present invention.

Here, the general pressure cooking process is carried out as shown in FIG. 7A. As the cooking proceeds, the microcomputer 101 controls a heating step and a recess step (for example, a steaming step for a grain pressure cooking) and determines a finish time of the respective steps and a steam discharge time point.

That is, the microcomputer 101 proceeds to the heating step by controlling the heater (not shown) raising the cooker temperature up to a predetermined temperature T1 in proportion to the elapsed time.

When the cooker temperature reaches the predetermined temperature T1, the microcomputer 101 controls the heater (not shown) to stop the heating temporarily and determines whether the cooker temperature has fallen to a predetermined temperature T2 (T2<T1).

At this time, if the cooker temperature has dropped to the predetermined temperature T2, the microcomputer 101 controls the heater (not shown) to resume heating until the cooker temperature is raised to a predetermined temperature T3 (T3>T2). That is, if the cooker temperature is raised to the predetermined temperature T3, the heating is temporarily halted, and if dropped to the predetermined temperature T2, the heating is resumed. The completion of the heating process is achieved by repeating the heating steps.

Figure 5:
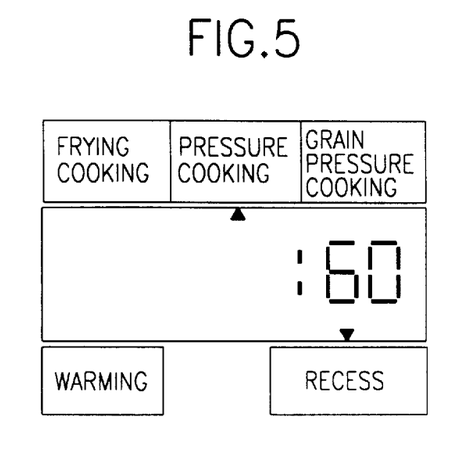
FIG. 5 is an exemplary view illustrating the display unit in FIG. 2 when set for a recess process.

As shown in FIG. 5, when the heating process near its end, the microcomputer 101 causes to be displayed a recess time on the display unit 106, and determines whether the time has reached a time point a few minutes prior to the termination of the recess step.

At this time, when the cooking process has reached a time point of a few minutes (for example, two minutes) prior to the completion of the recess step, the microcomputer 101 controls the valve driving unit 103 to turn on/off the transistor Q1, whereby the steam discharge valve 104 becomes operated for thereby discharging the pressurized steam from the cooker.

That is, as shown in FIG. 7C, when the cooking process has reached a time point of a few minutes prior to the completion of the recess step, the microprocessor 101 turns transistor Q1 on for one second and then turns off, so that the steam discharge valve 104 remains opened for one second and closed for another second so as to notify to the user at the completion time point of the cooking and the steam discharge operation. Then, the transistor Q1 resumes its turned-on state thereby maintaining an opened state of the pressurized steam discharge valve 104 and discharge the steam from the cooker.

Also, as shown in FIG. 7B, when the completion time point of the cooking operation is reached, the microcomputer 101 transmits the buzzer driving signal to the buzzer 102 to generate the buzzer sound so as to notify the user of the completion of the cooking.

Here, when the grain pressure cooking mode is selected from the menu, the microcomputer 101 controls the valve driving unit. 103 at a time point of the cooking completion, and the transistor Q1 is turned off to close the steam discharge valve 104 and then the warming operation is displayed on the display unit 106 while proceeding to the warming operation.

Also, when the steam discharge button 115 of the key input unit 105 disposed on the control panel is pressed during the recess step, the microcomputer 101 recognizes the pressing as a compulsory steam discharge command, so that the valve driving signal is outputted in a high level to the valve driving unit 103 as shown in FIG. 7D, whereby the steam discharge valve 104 remains opened for thereby discharging the pressurized steam from the cooker.

Then, when the pressure cooking is completed with the completion of the recess step, the microcomputer 101 transmits the buzzer driving signal to the buzzer 102 as shown in FIG. 7B so as to generate the buzzer sound, thereby notifying the user of cooking completion of the.

Figure 8:
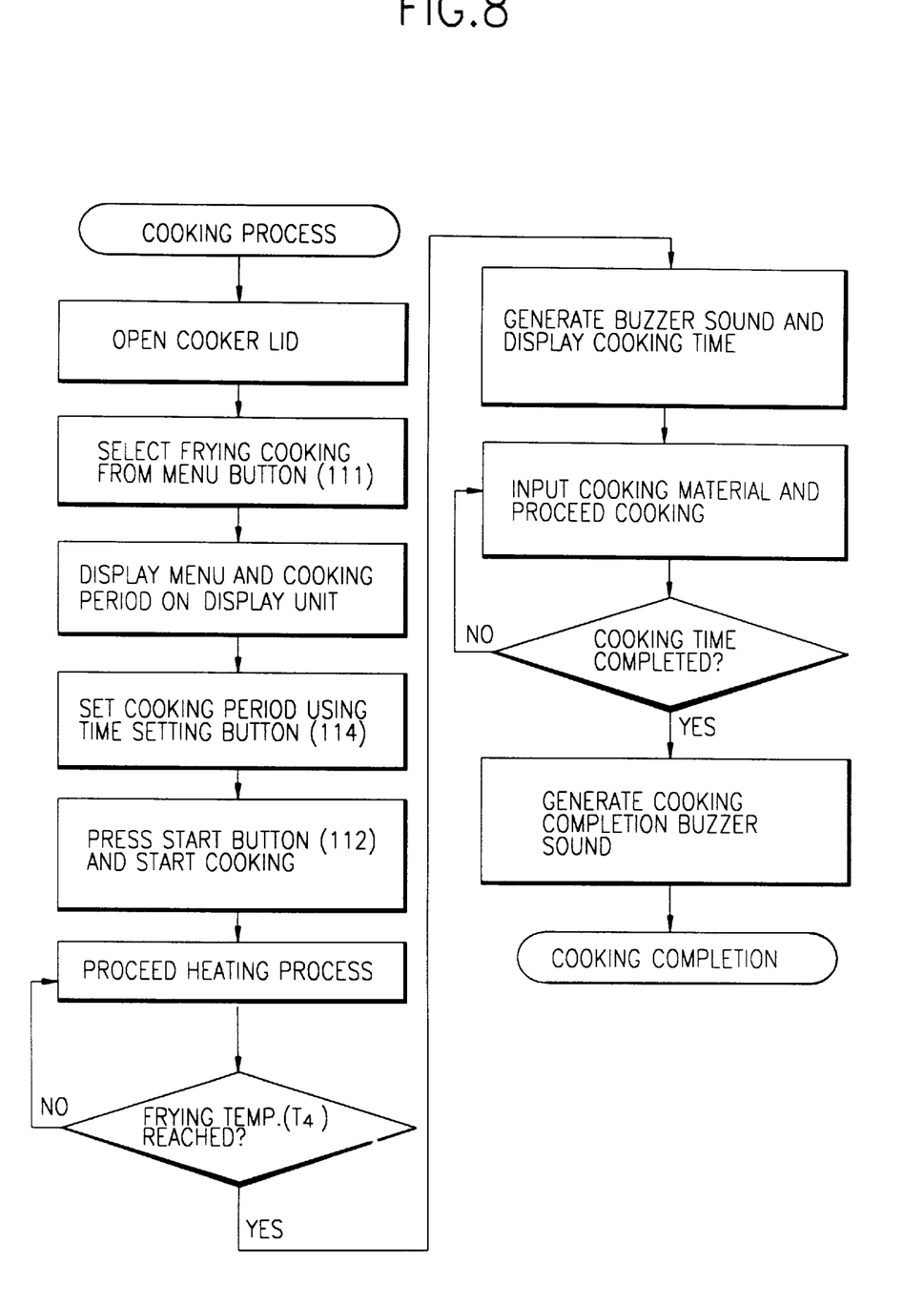
FIG. 8 is a flow chart illustrating a frying cooking process of the electrical thermostatic pressure cooker according to the present invention.

Meanwhile, with reference to FIG. 8, a frying cooking process according to the present invention will now be explained in further detail.

Figure 3:
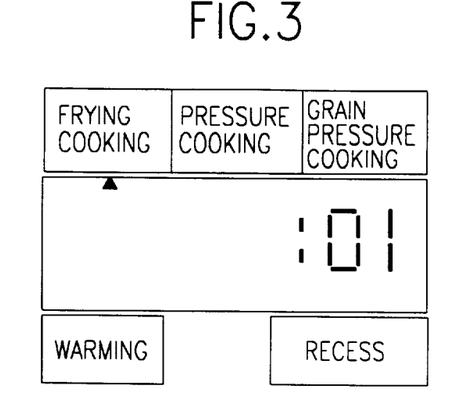
FIG. 3 is an exemplary view illustrating a display unit in FIG. 2 when set for frying cooking.

First, when the frying cooking mode is selected with the menu button 111 of the key input unit 105 in a state in which the lid of the cooker is opened, the microcomputer 101 causes to be displayed the selected menu and the pressure cooking time period on the display unit 106 as shown in FIG. 3.

At this time, the user can change the cooking time period using the time setting button 114.

When the cooking start button 112 is pressed after setting the cooking mode and the cooking time period, the microcomputer 101 starts the cooking operation.

Figure 6:
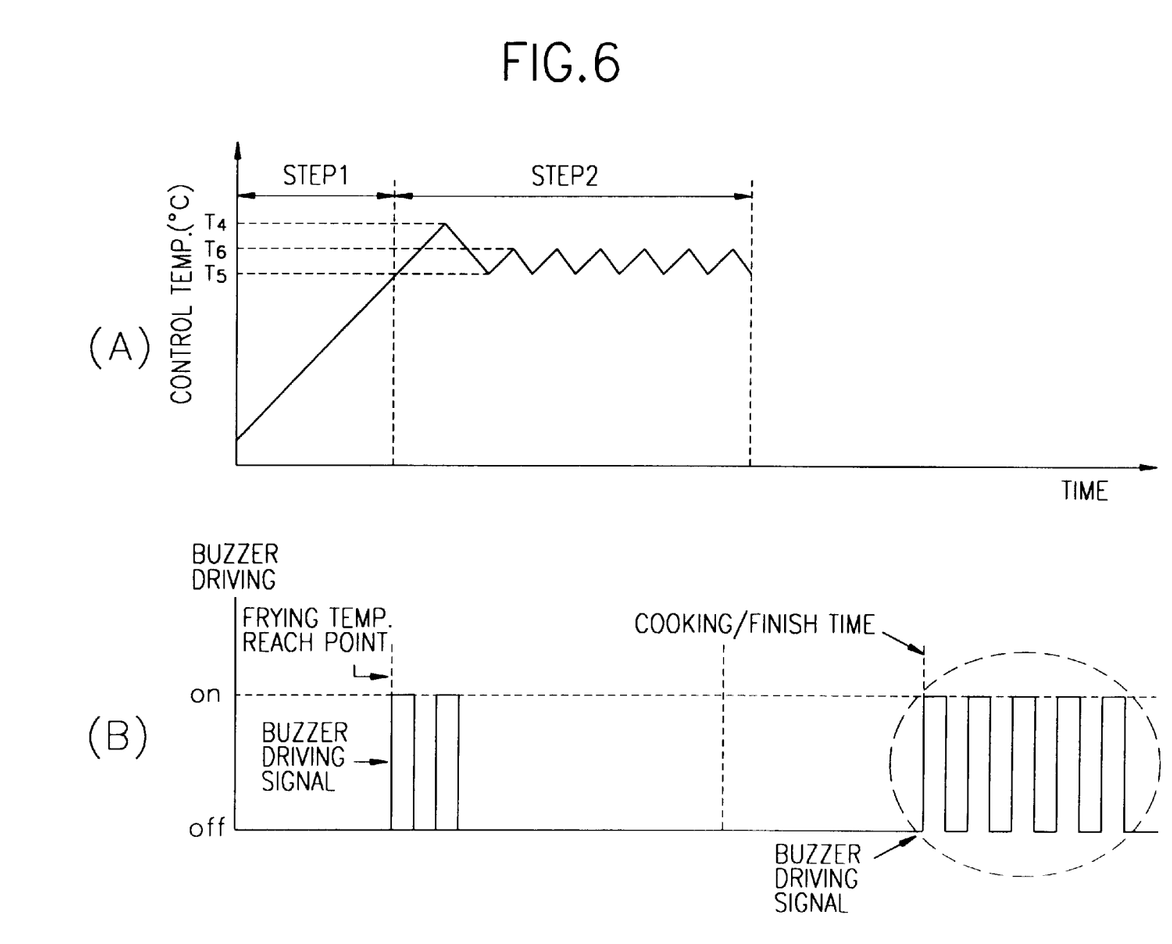
FIGS. 6A and 6B are waveform diagrams illustrating signals in the frying cooking process of the electrical thermostatic pressure cooker according to the present invention.

Here, as shown in FIG. 6A, the frying cooking process is carried out such that the microcomputer 101 controls the heating process as the cooking proceeds, and determines the time points of the termination of the cooking and the buzzer driving.

That is, the microcomputer 101 controls the heater operation to heat the cooker to raise the cooker temperature in proportion to the time that has elapsed until a predetermined temperature T4 is reached.

Then, when the cooker temperature T4 has reached the predetermined temperature T4, the microcomputer 101 intermittently outputs the buzzer driving signal in a high state for a predetermined time period so as to apply the voltage AVcc to the buzzer 102 thereby generating the buzzer sound thereby notifying the user of the start time point of the frying cooking operation.

When the cooker temperature has reached the predetermined temperature T4, the microcomputer 101 controls the heater to temporarily stop the heating operation and judges whether the cooker temperature has fallen to a predetermined temperature T5 (T5<T4).

At this time, when the cooker temperature has dropped to the predetermined temperature T5, the microcomputer 101 controls the heater to resume the heating until the cooker temperature rises to a predetermined temperature T6 (T6>T5), and when the cooker temperature has reached the predetermined temperature T6, the heating operation is temporarily halted, and when the cooker temperature has dropped to the predetermined temperature T5, heating is resumed. The completion of the pre-heating process is achieved by such a repetition.

Accordingly, when the cooker temperature is raised up to the predetermined temperature T4 and the raised temperature maintains a temperature range of T5–T6, the user appropriately fills the cooker with cooking ingredients and carries out the frying or roasting operation while well stirring the cooking ingredients.

As shown in FIG. 6B, when the frying or roasting cooking time period is completed, the microcomputer 101 intermittently outputs the buzzer driving signal for a predetermined time to the buzzer 102 so as to generate the buzzer sound to notify the user of the completion of the cooking.

As described above, the electrical thermostatic pressure cooker according to the present invention allows a user to make a random setting on cooking period as well as enabling frying in addition to conventional pressure-applied cooking with an improved convenience.

Further, the electrical thermostatic pressure cooker automatically discharges the steam therefrom each time when the cooking operation comes close to its completion in case of pressure cooking and it is able to forcibly discharge the steam depending upon the kinds of cooking, thereby satisfying the user as well as enabling a variety of cooking types.

As the present invention may be embodied in several forms without departing from the spirit of essential characteristics thereof, it should also be understood that the above-described embodiments are not limited by any of the details of the foregoing description, unless specified otherwise, but rather should be construed broadly within its spirit and scope as defined in the appended claims, and therefore all changes and modifications that fall within metes and bounds of the claims, or equivalences of such metes and bounds are therefore intended to embrace the appended claims.

What is claimed is:

1. In an electrical thermostatic pressure cooker, a cooking control apparatus comprising:

a menu button for selecting a cooking mode;

a time setting button for setting a time period of a predetermined cooking operation depending on the cooking mode;

a display means for displaying the cooking mode and an expected cooking time period;

an alarm means for indicating a cooking ingredient input time point and a cooking completion time point;

an electrically operated steam discharge valve for discharging pressurized steam from the cooker;

a compulsory button for causing activation of the steam discharge valve for forcibly discharging pressurized steam when a pressure cooking mode is set; and a control means for controlling the display of the cooking mode selected with the menu button and the cooking time period selected with the time setting button in accordance with execution of a stored program for a pressure cooking mode and a frying cooking mode, controlling the alarm means to generate an alarm sound to notify a user of the cooking ingredient input time when a predetermined temperature is reached when in the frying cooking mode while executing a heating process, driving the steam discharge valve to automatically discharge the pressurized steam after a predetermined time point prior to completion of the cooking operation and to continuously discharge the pressurized steam when indicated by a compulsory steam discharge command when in the pressure cooking mode, and again controlling the alarm means to generate the alarm sound to notify the user that the cooking operation has been completed at the completion time point.

2. A cooking control method for an electrical thermostatic pressure cooker, comprising:

a first step for determining whether a pressure cooking mode is set;

a second step for setting a cooking time period after setting the pressure cooking mode;

a third step for proceeding to a heating process when a cooking start button is pressed after the cooking time period is set and for determining whether a present time is a completion time point of a cooking operation or whether a steam discharge button is pressed;

a fourth step for displaying a recess time near a completion time point of the heating process while carrying out a recess process, and for determining whether the present time is a first predetermined time period prior to the completion of the recess process;

a fifth step for automatically discharging pressurized steam when the first predetermined time is reached prior to the completion of the recess process;

a sixth step for carrying out a forcible discharge of the pressurized steam when the steam discharge button is pressed; and a seventh step for generating a buzzer sound when the completion time point is reached.

3. The method of claim 2, wherein in the third step, the heating process comprises the sub-steps of:

heating the cooker until a temperature in the cooker reaches a first predetermined temperature (T1) when the cooking operation is started; and cyclically repeating a heating operation and a non-heating operation to maintain a temperature range between a second predetermined temperature (T2) and a third temperature (T3) for a second predetermined time period when the temperature within the cooker has reached the first predetermined temperature (T1), wherein T1>T2>T3.

4. The method of claim 3, wherein the cyclical repeating sub-step comprises the sub-steps of:

(a) determining whether the temperature within the cooker has dropped to the second predetermined temperature (T2) after the heating operation is temporarily stopped when the temperature within the cooker has reached the first predetermined temperature (T1);

(b) resuming the heating operation to raise the temperature in the cooker to the third predetermined temperature (T3) when the temperature in the cooker has reached the second predetermined temperature (T2); and (c) temporarily stopping the heating operation when the temperature in the cooker has reached the third predetermined temperature (T3), and repeating the sub-steps (a)–(c) until the heating operation is completed, wherein T1>T3>T2.

5. The method of claim 2, wherein the fifth step further comprises a step of continuously discharging the pressurized steam until the cooking operation is completed after the steam has been intermittently discharged for a second predetermined time period.

6. The method of claim 2, wherein a time for steam discharge is set to a time prior to a completion of the recess process so as to completely discharge the steam from the cooker by the time the cooking operation is completed.

7. The cooking control method for an electrical thermostatic pressure cooker, comprising:

a first step for determining whether a frying cooking operation is set;

a second step for setting a cooking time period when the frying cooking operation is determined to be set;

a third step for performing a heating operation for a predetermined time until a temperature in the cooker has reached a first predetermined temperature (T4) after a start button is pressed;

a fourth step for halting the heating operation and generating a buzzer sound when the temperature in the cooker has reached the first predetermined temperature (T4);

a fifth step for determining whether the cooking is completed while controlling the heating operation after ingredients to be cooked have been placed in the cooker so as to maintain a temperature range between a second predetermined temperature (T5) and a third predetermined temperature (T6); and a sixth step for completing the cooking operation after generating the buzzer sound when the cooking operation is completed, wherein T4>T6>T5.

8. The method of claim 7, wherein the fifth step comprises the sub-steps of:

(a) determining whether the temperature in the cooker has dropped to the predetermined temperature (T5) after a temporary stoppage of the heating operation after the temperature in the cooker has reached the predetermined temperature (T4);

(b) resuming the heating operation so as to raise the temperature in the cooker to the third predetermined temperature (T6) after the temperature in the cooker has reached the second predetermined temperature (T5); and (c) temporarily stopping the heating operation when the temperature in the cooker has reached the third predetermined temperature (T6), and thereafter repeating sub-steps (a) to (c).

9. The electrical thermostatic pressure cooker of claim 1, wherein when the selected cooking mode is the frying mode, the electrical thermostatic pressure cooker is operable as one of a roaster, browner and sauteer.

10. The cooking control method of claim 7, wherein the frying mode includes roasting, browning and sauteing.

* * * * *